US010875471B2

(12) United States Patent
Sahin

(10) Patent No.: US 10,875,471 B2
(45) Date of Patent: Dec. 29, 2020

(54) INTERIOR CLADDING ARRANGEMENT FOR A LOAD SPACE

(71) Applicant: Ford Global Technologies, LLC, Dearborn, MI (US)

(72) Inventor: Mehmet Sahin, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 16/386,658

(22) Filed: Apr. 17, 2019

(65) Prior Publication Data

US 2019/0322226 A1 Oct. 24, 2019

(30) Foreign Application Priority Data

Apr. 19, 2018 (DE) ........................ 10 2018 206 002

(51) Int. Cl.
*B60R 13/01* (2006.01)
*B60R 13/02* (2006.01)

(52) U.S. Cl.
CPC ........ *B60R 13/011* (2013.01); *B60R 13/0206* (2013.01); *B60R 13/0237* (2013.01); *B60R 2013/018* (2013.01); *B60R 2013/0287* (2013.01)

(58) Field of Classification Search
CPC ... B60R 13/01; B60R 13/011; B60R 13/0206; B60R 13/0237
USPC .............................................. 296/1.08, 39.01
See application file for complete search history.

(56) References Cited

U.S. PATENT DOCUMENTS

| | | | | | |
|---|---|---|---|---|---|
| 4,893,862 | A * | 1/1990 | Hollenbaugh, Sr. | B60R 13/01 296/39.1 |
| 4,917,431 | A * | 4/1990 | McDonald | B60R 13/01 296/39.1 |
| 5,076,870 | A | 12/1991 | Sanborn | |
| 5,111,619 | A * | 5/1992 | Billin | B60R 13/0206 24/297 |
| 5,139,300 | A * | 8/1992 | Carriere | B60R 13/01 296/24.44 |
| 5,188,408 | A | 2/1993 | Berdan et al. | |
| 5,536,540 | A | 7/1996 | Borys et al. | |
| 8,020,919 | B2 * | 9/2011 | Lin | B60J 5/0468 296/146.7 |
| 2012/0274116 | A1 | 11/2012 | Palmer | |

FOREIGN PATENT DOCUMENTS

| | | | | |
|---|---|---|---|---|
| DE | 102004018763 B3 | 5/2005 | |
| EP | 1512582 A1 | 3/2005 | |
| EP | 1914120 A1 | 4/2008 | |
| FR | 3011891 B1 * | 2/2016 | F16B 5/0291 |

* cited by examiner

*Primary Examiner* — Jason S Daniels
(74) *Attorney, Agent, or Firm* — David Coppiellie; Price Heneveld LLP

(57) ABSTRACT

An interior cladding arrangement for a load space of a vehicle, which comprises a support wall for supporting a cover panel of a load space, and a cover wall for interior cladding of the load space. The support wall has a support wall connecting portion assigned to the cover wall, and the cover wall has a cover wall connecting portion assigned to the support wall. The support wall connecting portion comprises at least one support wall connecting element, and the cover wall connecting portion comprises at least one cover wall connecting element, wherein the support wall connecting element and the cover wall connecting element are configured for mutual guided engagement.

17 Claims, 4 Drawing Sheets

INTERIOR CLADDING ARRANGEMENT FOR A LOAD SPACE

FIELD OF THE INVENTION

The present invention generally relates to an interior cladding arrangement with a support wall for a cover panel for a load space, and more particularly relates to such an arrangement for a load space in a motor vehicle, and a cover wall.

BACKGROUND OF THE INVENTION

Components for interior cladding in the automotive sector have amongst others decorative, supportive and/or protective functions. Depending on design and function, hard-shell components made by injection molding are distinguishable from soft components made of foamed plastic, and carpet-like cladding, e.g., made of plastic fibers, for example. Depending on the form of the vehicle interior, panels with widely varying geometric shapes are often required. Since the interior cladding is part of the visible components of the vehicle interior, the geometries of individual cladding walls typically must have a visibly high quality, where possible already installed as a finished product ("fit-n-finish").

Such interior cladding is also present in the load space or luggage compartment of a motor vehicle and/or a car. In order to separate the load space from the passenger cell and thus protect the occupants from an unsecured load, e.g., on abrupt braking or in the case of an accident, the load space is typically limited in its upper region by a cover panel. The cover panel usually runs parallel to and at a distance from a lower load surface of the load space, and is arranged behind or adjoins the rear seat of the car. An upper stowage surface of the cover panel is often accessible to occupants of the car from the passenger cell and may be used for stowing a wide range of objects.

This load space cover panel may be attached to and/or be supported on a support wall in the load space. Also, the interior cladding of the load space typically comprises soft carpet-like cladding as cover elements. The prior art discloses various installation processes for support elements with cover element(s), and for cover element(s).

Thus, for example, support walls and the other cover elements may be installed separately from each other. Typically, this is achieved using screw fittings, clamps or other fixing techniques, wherein for these variants corresponding devices usually must be provided, all of which require space. For this reason, the components of the interior cladding are generally arranged spaced apart from the body shell, whereby the available load space is necessarily reduced. Alternatively, the components of the interior cladding may be welded together before installation, whereby the components offer mutual support. This however typically requires additional working steps.

U.S. Pat. No. 5,536,540 discloses cladding components on the outside of the vehicle, which have a solid base plate and a decor trim which is flexible relative to the base plate. The base plate and decor trim have mutually complementary snap-catch elements, whereby the decor trim can be pressed onto the base plate. The base plate itself is connected to the vehicle by use of an adhesive tape.

U.S. Pat. No. 5,188,408 also discloses a method for installing a plastic cover with a trim on the outside of the vehicle, wherein the trim may be attached to the outside of a vehicle door. Both components have protrusions and/or counter-hooks which, for fixing, are brought into engagement with complementary cutouts, channels and/or depressions on the respective other component. After mounting, the trim may be attached to the outside of the vehicle door using conventional fixing techniques.

U.S. Patent Application Publication No. 2012/0274116 A1 discloses a fixing arrangement for a hard-shell rear cover of a backrest of a vehicle seat with upholstery, e.g., made of textile, vinyl or leather (soft-shell). In the peripheral region, the upholstery comprises holding elements which may brought into engagement with retaining openings in the hard-shell cover.

U.S. Pat. No. 5,076,870 discloses a method for connecting a decorative covering to the interior paneling of a vehicle door. The decorative covering comprises a layer of thermally deformable material. For installation or production, the components of the interior paneling and the covering are overlaid on each other in layers and heated locally, preferably by a welding head, so that a permanent connection results from a melt process.

In view of the outlined prior art, the design of an interior cladding arrangement leaves room for improvement. A disadvantage with the outlined prior art is for example that the hard-shell components and the decorative components are exclusively overlaid on each other in layers. In the load space, this may lead to a reduction in size of the load space, whereby the load volume is reduced. In addition, the mounting processes described above generally require a high number of mounting steps, whereby the error rate and costs are increased.

Therefore, it would be desirable to provide an improved interior cladding arrangement for a load space of a vehicle which has a support wall for a cover panel with one or more further cover walls, which can be installed as easily as possible and which provides as much load space as possible and high visible quality of production or installation precision.

SUMMARY OF THE INVENTION

According to one aspect of the present invention, an interior cladding arrangement for a load space of a vehicle is provided. The interior cladding arrangement includes a support wall for supporting a cover panel of the load space, and a cover wall for interior cladding of the load space, wherein the support wall has a support wall connecting portion assigned to the cover wall and the cover wall has a cover wall connecting portion assigned to the support wall, wherein the support wall connecting portion comprises at least one support wall connecting element, and the cover wall connecting portion comprises at least one cover wall connecting element, and wherein the support wall connecting element and the cover wall connecting element are configured for mutual guided engagement.

According to another aspect of the present invention, a vehicle is provided. The vehicle includes a load space, a cover panel of the load space, and an interior cladding arrangement. The interior cladding arrangement includes a support wall for supporting the cover panel of the load space, and a cover wall for interior cladding of the load space, wherein the support wall has a support wall connecting portion assigned to the cover wall and the cover wall has a cover wall connecting portion assigned to the support wall, wherein the support wall connecting portion comprises at least one support wall connecting element, and the cover wall connecting portion comprises at least one cover wall connecting element, and wherein the support wall connecting element and the cover wall connecting element are configured for mutual guided engagement.

These and other aspects, objects, and features of the present invention will be understood and appreciated by those skilled in the art upon studying the following specification, claims, and appended drawings.

DETAILED DESCRIPTION OF THE PREFERRED EMBODIMENTS

In the various figures, the same parts always carry the same reference signs so these are usually only described once. If individual components, elements or assemblies are cited in the singular, this also includes multiples.

Figure 1:
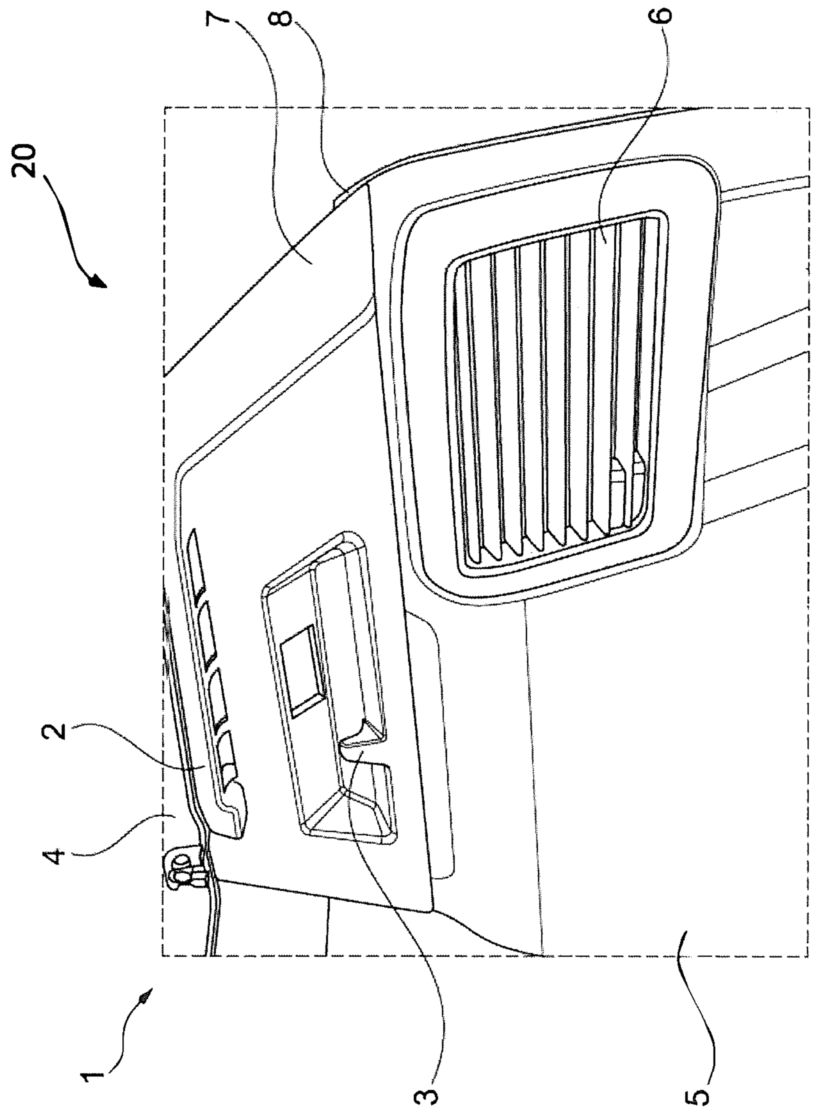
FIG. 1 is a perspective view of an exemplary embodiment of an interior cladding arrangement of a vehicle from the prior art.

FIG. 1 shows an arrangement known from the prior art for an interior cladding, i.e., an interior cladding arrangement 1. The interior cladding arrangement 1 depicted has a support wall 2 with a cover panel attachment device 3. The cover panel attachment device 3 is here configured as an upwardly protruding hook element in which, for support, the cover panel or parcel shelf, delimiting the load space of a motor vehicle 20 at the top, may be attached or inserted. Furthermore, the interior cladding arrangement 1 is connected to the vehicle body 4. The support wall 2 as a supporting element is typically formed as a hard-shell component made by injection molding. Adjacent or next to this is a cover wall 5, which usually fulfils substantially decorative and/or protective functions. Therefore the cover walls 5 are formed as soft components of foamed plastic or as carpet-like cladding, e.g., of plastic fibers. For ventilation of a motor vehicle interior, the cover wall 5 may for example comprise ventilation orifices 6 or vent openings.

To connect the support wall 2 to the cover wall 5, a support wall connecting region 7 and a cover wall connecting region 8 are provided. The two connecting regions 7, 8 may be configured as edges and lie flat on each other to form a connection. A good fit is decisive for a high precision of production and installation. For the final installation, the support wall connecting region 7 and cover wall connecting region 8 may be for example screwed, clamped and/or welded together and/or to the vehicle body 4.

Figure 2:
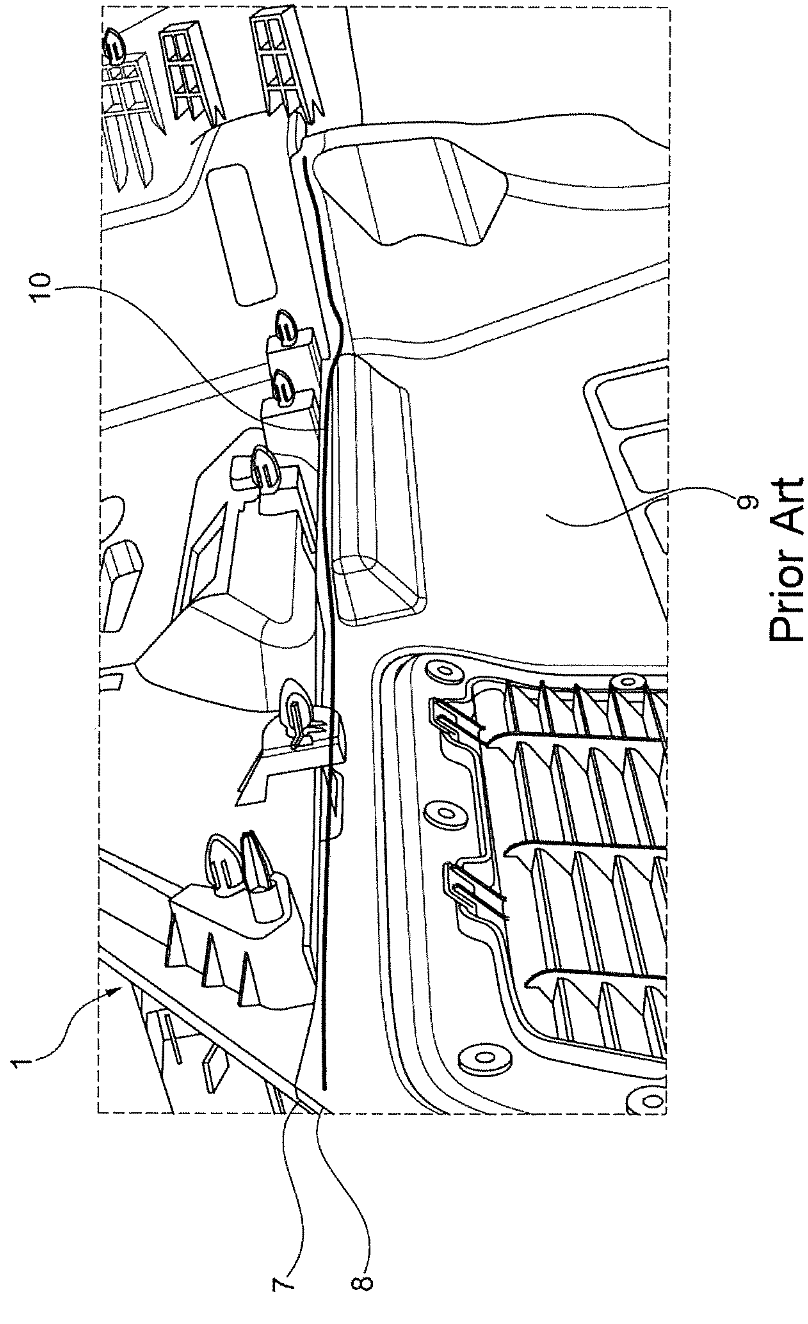
FIG. 2 is a perspective view of an exemplary embodiment of an interior cladding arrangement from the prior art from the rear.

FIG. 2 shows a rear view of the interior cladding arrangement 1 according to FIG. 1 from the prior art. After installation, the cover wall rear side 9 is typically concealed from the observer. The support wall connecting region 7 and the cover wall connecting region 8 form a common connecting region 10, which is here indicated as a line and with arrows. The cover wall rear side 9 is formed without openings in the connecting region 10, so that no guided engagement can be created which would secure the support wall connecting region 7 and cover wall connecting region 8 against slipping after installation.

Figure 3:
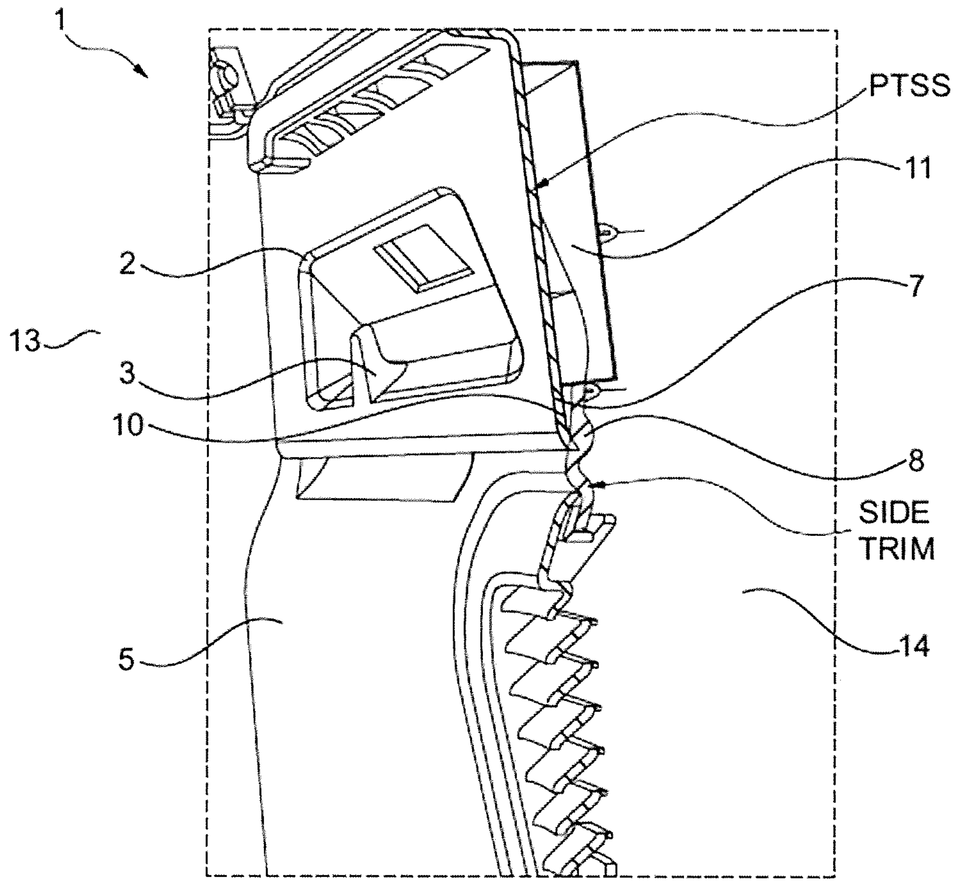
FIG. 3 is a perspective view of an exemplary embodiment of an interior cladding arrangement from the prior art in a sectional depiction.

FIG. 3 shows a sectional view of the interior cladding arrangement 1 according to FIG. 1 from the prior art. The support wall connecting region 7 and the cover wall connecting region 8 overlap each other in layers in the connecting region 10. The support wall 2 and cover wall 5 separate the load space 13 from the exterior space 14 which lies between the interior cladding arrangement 1 and the body (not shown). Various spacer devices 11 are arranged in this exterior space 14 and usually fulfil functions of fixing and/or additional support. The spacer devices 11 are not a purpose in themselves; the exterior space 14 should be dimensioned as small as possible so that the volume of the load space 13 may be as large as possible.

Figure 4:
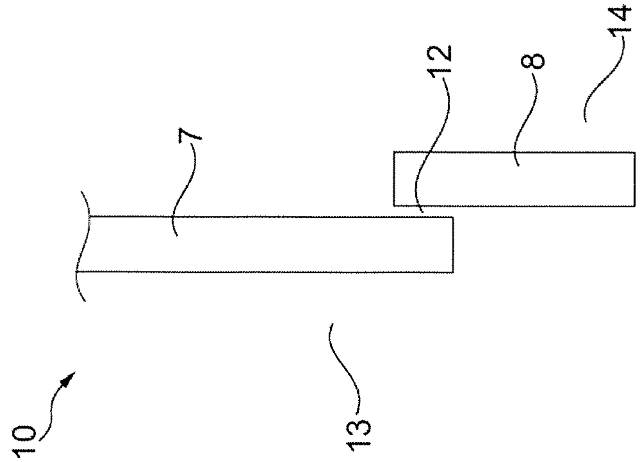
FIG. 4 is a diagrammatic depiction of an exemplary embodiment of an interior cladding arrangement from the prior art in a sectional depiction.

FIG. 4 shows a simplified, diagrammatic, sectional view of the connecting region 10 according to the prior art. The support wall connecting region 7 and cover wall connecting region 8 run substantially parallel and overlap each other in layers or lie flat against each other in the connecting region 10. In the connecting region 10, a joining region 12 is provided for fixedly connecting the support wall connecting region 7 and cover wall connecting region 8 together, e.g., by welding.

Figure 5:
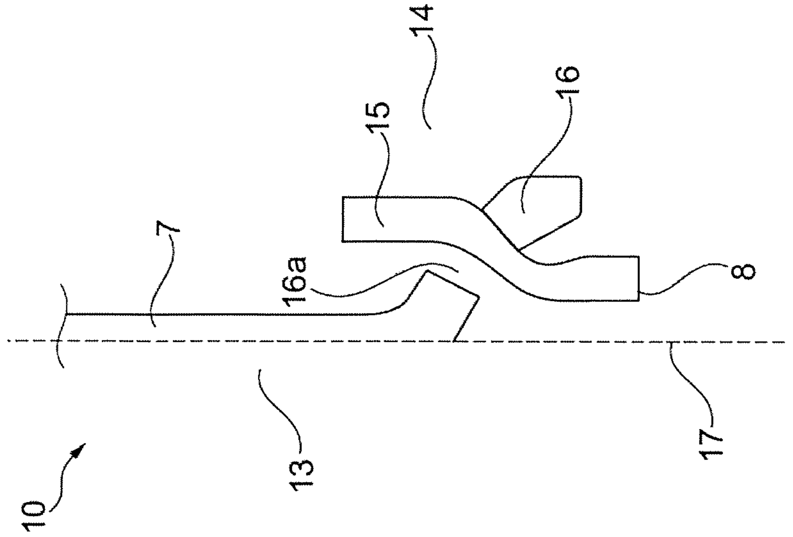
FIG. 5 is a diagrammatic illustration of an exemplary embodiment of an interior cladding arrangement in a sectional depiction.

FIG. 5 shows a simplified, diagrammatic, sectional view of the connecting region 10 according to one embodiment of the invention, which is configured as a guided engagement for the interior cladding arrangement 1 for a load space 13 of a vehicle 10. The connecting region 10 of FIG. 5 may be used in the interior cladding arrangement 1 for a load space 13 of a vehicle 20 shown in FIG. 1. The support wall connecting region 7 and cover wall connecting region 8 both run with a virtual S-shaped curve. At the end, the cover wall connecting region 8 has a cover wall connecting element 15 which may be formed as a hook element and/or as a flange element which is bent multiple times and in the embodiment shown is bent twice. Also, the support wall connecting region 7 has an end support wall connecting element 16, which again has an opening 16*a*. This opening 16*a* may be configured as a channel or elongate, but any continuous and/or discontinuous groove, channel, bore, pocket, rail, slot or other depression may be used. The cover wall connecting element 15, guided by at least one side wall of the channel-like opening 16*a*, may be pushed into the opening 16*a* and thus come into engagement therewith. Evidently, the person skilled in the art may provide additional engagement elements, e.g., counter-hooks, on the cover wall connecting element 15, whereby the connection between the support wall connecting region 7 and the cover wall connecting region 8 can no longer be released without destruction.

The almost S-shaped or meandering or step-like curved contours of the support wall connecting region 7 and cover wall connecting region 8 are oriented such that in each case, a surface of the support wall 2 (see FIG. 1) and the cover wall 5 (see FIG. 1) lie flush against each other. In this way, an approximate plane 17 is formed which faces the load space 13. This plane 17 conceals the connecting region 10 from a fleeting glance of the observer, thus giving a high design quality or high precision of production and installation ("fit-n-finish").

It is pointed out that the features and measures listed individually in the description below may be combined with each other in any technically sensible fashion and disclose further embodiments of the disclosure. The description characterizes and specifies the disclosure further, in particular in connection with figures.

An interior cladding arrangement is proposed for a load space of a vehicle, in particular a car, which comprises a support wall for supporting a load space cover panel and a cover wall for interior cladding of the load space. The support wall has a support wall connecting portion assigned to the cover wall, and the cover wall has a cover wall connecting portion assigned to the support wall. In addition, the support wall connecting portion comprises at least one support wall connecting element, and the cover wall connecting portion comprises at least one cover wall connecting element, wherein the support wall connecting element and the cover wall connecting element are configured for mutual guided engagement.

A guided engagement means that the connecting elements are geometrically configured such that when inserted in each other in the manner of a template or keyhole connection, this necessarily leads to the proposed final positioning of the interior cladding elements relative to each other. In this way, errors on installation can be avoided and a higher accuracy of production or installation can be achieved. No additional mounting step, such as, e.g., welding and/or clamping of the interior cladding elements, is therefore now required. Such a guided engagement is based on the concept of functional integration, i.e., the integration of additional functions in the cover wall or support wall. Due to functional integration, the functionality of the individual components may be increased and the number of parts in the interior cladding arrangement reduced. In particular, by integration of the connecting elements for a connection between the two parts ("part2part"), the installation complexity for the fitter may be reduced, whereby time and costs can be saved.

Preferably, the support wall connecting element and the cover wall connecting element of the interior cladding arrangement are configured as a push-fit connection. The push-fit connection allows rapid installation, whereby the installation process may be shortened. The push-fit connection may be configured so as to be releasable or non-releasable. Thanks to the push-fit connection, the cover wall is already fixedly connected to the support wall before the latter is attached to the body shell. Therefore no additional welding step is required. Also, no spacer devices are now required to maintain a distance between the interior cladding and the body shell in order to provide sufficient space for connecting element such as push-fit or retaining connections. Because of the form-fit connection, the cover wall rests on the support wall itself, whereby displacement in the direction of the outside of the vehicle is not possible, or the necessary distance is maintained.

It is furthermore advantageous if at least one cover wall connecting element is configured as a hook for guided engagement in a support wall connecting element. This hook is preferably configured integrally with the cover wall. In this description, the cover wall connecting element is also described as a hook, and the support wall connecting element as a complementary counter-piece to the hook. It expressly falls under the scope of protection that the support wall connecting element may also comprise the hook, and the cover wall connecting element the complementary counter-piece for the guided engagement. The hook may also be designed as a flange with multiple bends, or have an S-shaped and/or meandering and/or step-like contour.

According to one embodiment, at least one support wall connecting element is configured as a flange with multiple bends for guided reception of a cover wall connecting element. The support wall connecting element may therefore have an S-shaped and/or meandering and/or step-like contour. This contour allows guided engagement with a cover wall connecting element.

Suitably, at least one support wall connecting element configured as a flange with multiple bends comprises a channel-like opening which is designed for guiding a cover wall connecting element, configured in particular as a hook. Because of the form of the opening, in particular with a channel-like contour, this acts as a keyhole with substantially form-fit connection to the shape of the support wall connecting element. This ensures that the cover wall and support wall remain in the intended position relative to each other, i.e., are effectively clamped in this position.

In an optional refinement of the disclosure, a surface of the support wall and a surface of the cover wall may be arranged so as to run substantially flush along a common plane. In this way, the precision of the design can already be assessed on installation and if necessary corrected. Furthermore, due to a constant contour, a pleasing visual impression is achieved and the transition between the support wall and the cover wall fades into the background. For this type of design, it is furthermore advantageous that the precision and the associated visual impression can be achieved even without welding.

In the state mounted on and/or already installed in the vehicle, the support wall connecting portion and the cover wall connecting portion overlap each other, preferably in a connecting region, wherein at least one support wall connecting element and at least one cover wall connecting element engage behind each other. This is achieved for example because the cover wall connecting element and/or support wall connecting element are bent multiple times, in particular complementarily to each other, and/or comprise complementary openings and hooks. In mutual engagement, these elements engage behind each other, and thereby retain the connection particularly securely against accidental slipping.

Furthermore, the connecting region between the support wall and the cover wall may be formed in a single, guided assembly step. The two parts may for example simply be pressed together or interlocked with no additional welding being necessary. Thus the arrangement is suitable as a contribution to a locator strategy, in which guided mounting steps which are as simple as possible prevent incorrect assembly. In particular, the support wall or cover wall is configured in the manner of a template and/or keyhole, such that incorrect assembly is simply not possible because of the design.

In an exemplary embodiment of the disclosure, a distance from a vehicle body, along which the cover wall may be arranged, can be adjusted by use of the support wall connecting portion. The distance from the body is predefined by the geometric shape, in particular the design of the flange which preferably rests on the body. Additional spacer devices are preferably neither desired nor required. Due to engagement with the support wall, it is no longer possible, even without welding or additional spacer devices, to accidentally push the cover wall outward, which would lead to a gap between the cover wall and support wall. This allows the exterior space, i.e., the intermediate space between the interior cladding and the body, to be designed as small as possible and hence achieve as much load space as possible. The use of the load space may be furthermore improved by the design of the cover wall with a stepped configuration. Here, for example, a hook of a cover wall may have a contour which is curved like a flange, or have a step, so that sufficient space remains for receiving one or more ventilation orifices which may be arranged inside openings in the cover wall. Ventilation orifices are typically formed in that a ventilation grille is mounted as a separate component on an opening in the cover wall. The fixing arrangement for this are arranged on the rear side of the cover wall. A stepped design may also mean that the cover wall has a convex curvature, whereby the region around the ventilation orifices may be mounted closer to the vehicle body, thus increasing the available load space.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An interior cladding arrangement for a load space of a vehicle, comprising:

a support wall for supporting a cover panel of the load space; and a cover wall for interior cladding of the load space, wherein the support wall has a support wall connecting portion assigned to the cover wall and the cover wall has a cover wall connecting portion assigned to the support wall, wherein the support wall connecting portion comprises at least one support wall connecting element, and the cover wall connecting portion comprises at least one cover wall connecting element, and wherein the support wall connecting element and the cover wall connecting element are configured for mutual guided engagement, wherein the at least one support wail connecting element is configured as a flange with multiple bends for guided reception of the cover wall connecting element, and wherein the at least one support wall connecting element configured as a flange with multiple bends comprises a channel-like opening which is designed for guiding the cover wall connecting element configured as a hook.

2. The interior cladding arrangement as claimed in claim 1, wherein the support wall connecting element and the cover wall connecting element are configured as a push-fit connection.

3. The interior cladding arrangement as claimed in claim 1, wherein at least one cover wall connecting element is configured as a hook for guided engagement in the support wall connecting element.

4. The interior cladding arrangement as claimed in claim 1, wherein a surface of the support wall and a surface of the cover wall are arrangeable so as to run substantially flush along a common plane.

5. The interior cladding arrangement as claimed in claim 1, wherein the support wall connecting portion and the cover wall connecting portion overlap each other in a connecting region, and wherein at least one support wall connecting element and at least one cover wall connecting element engage behind each other.

6. The interior cladding arrangement as claimed in claim 5, wherein the connecting region between the support wall and the cover wall are formed in a single, guided assembly step.

7. An interior cladding arrangement for a load space of a vehicle, comprising:

a support wall for supporting a cover panel of the load space; and a cover wall for interior cladding of the load space, wherein the support wall has a support wall connecting portion assigned to the cover wall and the cover wall has a cover wall connecting portion assigned to the support wall, wherein the support wall connecting portion comprises at least one support wall connecting element, and the cover wall connecting portion comprises at least one cover wall connecting element, and wherein the support wall connecting element and the cover wall connecting element are configured for mutual guided engagement, wherein a distance from a vehicle body, along which the cover wall may be arranged, is adjustable by the support wall connecting portion.

8. The interior cladding arrangement as claimed in claim 1, wherein the vehicle is a car.

9. A vehicle comprising:

a vehicle body:

a load space;

a cover panel of the load space; and an interior cladding arrangement comprising:

a support wall for supporting the cover panel of the load space; and a cover wall for interior cladding of the load space, wherein the support wall has a support wall connecting portion assigned to the cover wall and the cover wall has a cover wall connecting portion assigned to the support wall, wherein the support wall connecting portion comprises at least one support wall connecting element, and the cover wall connecting portion comprises at least one cover wall connecting element, and wherein the support wall connecting element and the cover wall connecting element are configured for mutual guided engagement, wherein the distance from a vehicle body, along which the cover wall may be arrange, is adjustable by the support wall connecting portion.

10. The vehicle as claimed in claim 9, wherein the support wall connecting element and the cover wall connecting element are configured as a push-fit connection.

11. The vehicle as claimed in claim 9, wherein at least one cover wall connecting element is configured as a hook for guided engagement in the support wall connecting element.

12. The vehicle as claimed in claim 9, wherein the at least one support wall connecting element is configured as a flange with multiple bends for guided reception of the cover wall connecting element.

13. The vehicle as claimed in claim 12, wherein the at least one support wall connecting element configured as a flange with multiple bends comprises a channel-like opening which is designed for guiding the cover wall connecting element configured as a hook.

14. The vehicle as claimed in claim 9, wherein a surface of the support wall and a surface of the cover wall are arrangeable so as to run substantially flush along a common plane.

15. The vehicle as claimed in claim 9, wherein the support wall connecting portion and the cover wall connecting portion overlap each other in a connecting region, and wherein at least one support wall connecting element and at least one cover wall connecting element engage behind each other.

16. The vehicle as claimed in claim 15, wherein the connecting region between the support wall and the cover wall are formed in a single, guided assembly step.

17. The vehicle as claimed in claim 9, wherein the vehicle is a car.

* * * * *

UNITED STATES PATENT AND TRADEMARK OFFICE

CERTIFICATE OF CORRECTION

PATENT NO. : 10,875,471 B2
APPLICATION NO. : 16/386658
DATED : December 29, 2020
INVENTOR(S) : Sahin It is certified that error appears in the above-identified patent and that said Letters Patent is hereby corrected as shown below:

In the Claims

Column 7:
Claim 1, Line 32:
"wail" should be --wall--.

Column 8:
Claim 9, Line 15:
"body:" should be --body;--.
Claim 9, Line 33:
"arrange" should be --arranged--.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*